Sept. 9, 1952     C. F. WALSH     2,610,076
DEVICE FOR SPREADING AGRICULTURAL CHEMICALS
Filed Nov. 19, 1949
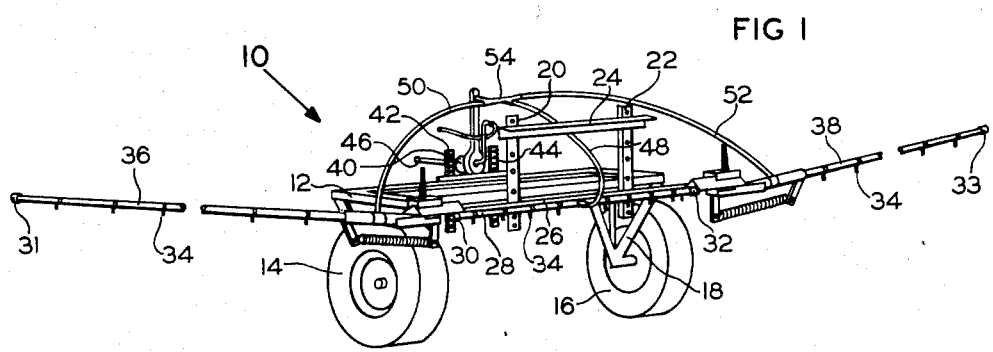
INVENTOR.
CLARK F. WALSH
BY Whiteley and Caine
ATTORNEYS Patented Sept. 9, 1952

2,610,076

UNITED STATES PATENT OFFICE 2,610,076

DEVICE FOR SPREADING AGRICULTURAL CHEMICALS

Clark F. Walsh, Nashua, Iowa

Application November 19, 1949, Serial No. 128,301

2 Claims. (Cl. 287—96)

My invention relates to a device for spreading agricultural chemicals. In particular it relates to improvements in a boom construction for spreading liquid over a relatively wide area of ground.

In recent years there has been a marked growth in the use of agricultural chemicals in liquid form which are distributed in the form of spray from a moving vehicle. Chemicals that are spread in this manner are either herbicides or insecticides, used to inhibit the growth of weeds or insects. In either instance the chemical is carried in a liquid state by a mobile device and is forcibly pumped into a boom containing a number of spray nozzles. In order to effectively cover a wide area of ground, the boom extends for a substantial distance on either side of the vehicle and in actual practice will have a length of from 16 to 24 feet. Because it would be impractical to transport the device over a highway or to permit its entry through a gate when the boom is of such a length, it is customary to provide some means of folding the outer ends of the boom so as to diminish its over-all dimension. Moreover, when the device is in actual use, obstructions in its path will sometimes necessitate lifting or folding a part of the boom to avoid the obstructions. In the prior art relating to flexible booms it has been the practice to use an elongated conduit having flexible liquid-conveying joints therein which will permit folding a part of the boom. Numerous forms of flexible joints have been used for this purpose but without great success because they either develop leaks or become stiff.

In the present invention I have provided an improvement in a boom structure by utilizing a plurality of separate sections of a conduit, one of which is directly and rigidly supported by a frame structure while the remainder are indirectly supported on either end of the frame structure by a hinge means which is not of the fluid conducting type. According to my arrangement, instead of pumping the liquid into the boom at one particular point and allowing it to spread over the full extent of the boom, I provide means whereby the liquid is pumped directly to each of the independent conduits. This not only provides a means of avoiding leaks at liquid joints, but also provides a more even distribution of the liquid by reducing friction through the boom and providing a liquid pressure which is substantially constant throughout all parts of the boom. Each of the hinge means is constructed to permit a limited amount of movement to the end extensions of the boom to provide the necessary flexibility when passing over rough ground, but a spring is used to bias the outer extension to its normal horizontal position and to absorb shocks transmitted to the outer end of the boom from the mobile vehicle. The hinge itself is composed of a pair of V-shaped bars, one of which nests within the other. The two bars are secured to each other by a large bolt which carries a heavy compression spring. This connection permits relative movement between the bars only by compression of the spring, thus avoiding uncontrolled movement of the hinge members.

An object of the invention is to provide in a boom structure having a central portion and a foldable outwardly extending portion, a hinge which supports the outwardly extending portion for folding movement relative to the central portion and which is also capable of flexibly absorbing shocks imparted to the outwardly extending portion when the vehicle which supports the boom passes over rough ground.

A further object is to provide in combination with a boom frame, a hinge composed of a pair of V-shaped members, one of which nests within the other, and which are relatively rotatable with respect to each other, together with means for biasing these members together to prevent their free rotation.

Other and further objects may become apparent from the following description and claims, and in the appended drawings in which:

Fig. 1 is a front perspective of a boom structure supported on a mobile mount;

Fig. 2 is an enlargement of the center portion of the structure shown in Fig. 1;

Fig. 3 is a front elevation of a mechanical hinge which supports an outer extension of the boom; and, Fig. 4 is an end elevation of the structure shown in Fig. 3 with the hinge rotated at a 90° angle.

Referring now to the several views of the drawings, the invention will be described in detail. General reference numeral 10 indicates a mobile vehicle consisting of a rectangular platform 12 which is supported on a pair of wheels 14, 16 by bracing elements 18. The mobile device 10 may be of any particular design or it may in fact be a farm wagon or any other form of vehicle, and insofar as this invention is concerned is merely a means of conveying a liquid supply, not shown, and providing a support for a boom structure, to be described hereinafter. Mounted on the rear end of platform 12 are a pair of uprights 20, 22 which are rigidly connected at their upper ends by a cross member 24. The members 20, 22 adjustably support an angle iron frame 26 which in turn supports a central conduit 28. The conduit 28 is sealed at its opposite ends by pipe caps 30, 32. Spaced intermediate the opposite ends of conduit 28 are a plurality of spray nozzles 34.

At either end of the frame 26 and extending in prolongation of the conduit 28 are outer extending conduits 36 and 38 which to all extent and purpose are the same as conduit 28. Each of these outer extending conduits is sealed at its outer end by pipe caps 31 and 33. Like conduit 28, the outer extending conduits 36, 38 also carry spray nozzles 34.

A pump 40 is adjustably supported on platform 12 by a pair of uprights 42, 44. Pump 40 is driven through connection 46, which extends to any form of motive power device, such as the power-take-off of a conventional tractor. The fluid inlet of the pump 47 is connected to the liquid supply, not shown, carried on the platform 12, and supplies liquid to the several conduits 28, 36 and 38 by flexible hoses 48, 50, 52.

Referring now to Figs. 3 and 4, is shown the manner in which the outwardly extending conduits 36, 38 are supported on the frame 26 for folding movement. A V-shaped member 56 is welded at 57 to the outer edge of the angle iron member 26 adjacent each of its outer ends. The member 56 is in fact a piece of angle iron of the same size and dimension as member 26. Positioned within the interior of member 56 is a second piece of angle iron 58 which has a U-shaped supporting frame 60 welded on its inner surface adjacent the outer extremity of its V-shaped arms. The U-shaped member 60 carries a tubular conduit 62 which is sealed at its inner end 64. The tubular member 62 is internally threaded at 66 to receive the inner threaded end of the outwardly extending conduits 36, 38. A nipple 65 extends into the tubular member 62 inwardly from the threaded portion 66 to receive the outer end of one of the flexible conduits 50, 52 extending from the pump 40. Member 62 is pivotally supported within the U-shaped member 60 by a pivot bolt 68. An adjustment bolt 70 extends through the lower surface of the U-shaped member 60 for contacting a part of the outer surface of the tubular member 62. A first lug 72 extends from the lower surface of the U-shaped member 60 at its rearmost end. A second lug 74 extends from the forward extremity of the tubular member 62. A spring 76 is connected between the outer ends of these lugs.

The angularly shaped members 56, 58, when parallel, as seen in Fig. 3, nest within each other and are connected by a bolt 78. At its outer end, bolt 78 carries a very powerful compression spring 80 which is secured between a washer 82 at one end and an inverted U-shaped housing 84 at its other end. The housing 84 is welded to the outer surface of member 56.

The operation of the invention will now be briefly described. With the parts in the position shown in Fig. 1, the outer extended conduits 36, 38 are projecting outwardly from the platform 12 of the mobile device 10 and the device is effective to distribute liquid chemicals in spray form over an area covered by the three conduits 28, 36 and 38. The pump 40, driven by the connection 46, causes liquid to be drawn into the pump through conduit 47 and distributed through the conduits 48, 50 and 52 to each of the conduits 28, 36 and 38 in substantially equal quantities and at a relatively uniform pressure. The control of this flow is regulated by valves or stop cocks, not shown.

The height of the center supporting member 26 is properly adjusted on the uprights 20, 22 so as to be above the level of the top of the crop over which the chemical is being spread, and it will be understood that in the case of small grain, or growing corn, that a substantial variation is necessary and is provided for by the adjustment just mentioned. The outwardly extending conduits 36, 38 are pivotally connected at 68 within the U-shaped member 60 and are normally held in horizontal alignment with the center conduit 28 by the set screw 70. Chains or ropes, not shown, extend between the uprights 20, 22 and the outer ends of conduits 36, 38. If spraying is to be performed alongside of a fence or other obstruction, it may be necessary to raise the outer end of one of the conduits by means of the chain or rope. Spring 76 extending between the lugs 72, 74 will resist raising the conduit, but the principal function of spring 76 is to act as a snubbing means to resiliently absorb shocks imparted to the outer conduits 36, 38, to prevent breakage of parts as vehicle 10 travels over rough ground. If the device 10 and its several parts are to be passed through a gate or placed in a barn, or transported along a highway, it is necessary that the extensions 36, 38 be rotated to diminish the over-all dimension. This may be accomplished by merely rotating the extension on the hinge structure. The member 58 is rotatable with respect to member 56, and it is shown in a 90° rotated position in Fig. 4. When so rotated on the rod 78, member 58 moves out of its nested position in the interior of member 56, causing rod 78 to move downwardly and compress the spring 80. The extensions 36, 38 may, therefore, be rotated in a 90° angle to place them in planes which are transverse to the plane of conduit 28 and the supporting frame 26, or they may be rotated through a 180° angle so that both of the extensions are parallel with and in rear of conduit 28.

The advantages of the invention reside in a flexible hinge structure for a boom by which shocks are absorbed to prevent leakage of parts and wherein the extended portions of the boom are adequately supported and may be held in any one of several positions.

My invention is defined in the terms of the appended claims.

I claim:

1. In a spray boom, a main support, an auxiliary support, hinge means connecting said supports to provide rotation of the auxiliary support about an axis which is perpendicular to the longitudinal axes of the two supports including a first V-shaped bar rigidly secured to the main support, a second V-shaped bar rigidly secured to the auxiliary support, one of said bars being loosely nested within the other, whereby when axially rotated it moves out of its nested position, a connecting member extending transversely through said bars, and resilient means cooperable between said connecting member and one of said bars for holding said bars in nested relation with each other to resist axial movement.

2. In a spray boom, a main support, an auxiliary support, hinge means connecting said supports to provide rotation of the auxiliary support about an axis which is perpendicular to the longitudinal axes of the two supports including a first V-shaped bar rigidly secured to the main support adjacent one end thereof, a second V-shaped bar rigidly secured to the auxiliary support, the linear dimensions of one of said bars being shorter than the maximum transverse inner dimension of the other bar, the shorter of said bars being loosely nested within the interior of the other bar whereby when rotated on a perpendicular axis through an angle of 180° it moves out of and returns to its nested position, a connecting member joining said bars and forming an axis of rotation between the bars, and resilient means cooperable between said connecting member and one of said bars for resisting axial movement and holding said bars in a nested position.

CLARK F. WALSH.

REFERENCES CITED

The following references are of record in the file of this patent:

UNITED STATES PATENTS

| Number | Name | Date |
|---|---|---|
| 167,948 | Smith | Sept. 21, 1875 |
| 248,067 | Taylor | Oct. 11, 1881 |
| 1,470,246 | Willis et al. | Oct. 9, 1923 |
| 2,169,948 | Gallupe | Aug. 15, 1939 |
| 2,210,346 | Stayton | Aug. 6, 1940 |
| 2,488,305 | Manger | Nov. 15, 1949 |

OTHER REFERENCES

Speedy Sprayer Advertisement, Farms Implement News of Nov. 18, 1948, page 107, published by Farm Implements News Publication Co., Chicago, Ill.